United States Patent
Sivabalan et al.

(10) Patent No.: US 7,646,772 B2
(45) Date of Patent: Jan. 12, 2010

(54) GRACEFUL SHUTDOWN OF LDP ON SPECIFIC INTERFACES BETWEEN LABEL SWITCHED ROUTERS

(75) Inventors: Muthurajah Sivabalan, Kanata (CA); Sami Boutros, Kanata (CA); David Ward, Somerset, WI (US); Syed Kamran Raza, Ottawa (CA); Robert Thomas, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1040 days.

(21) Appl. No.: 10/918,089

(22) Filed: Aug. 13, 2004

(65) Prior Publication Data

US 2006/0034251 A1    Feb. 16, 2006

(51) Int. Cl.
*H04L 12/28* (2006.01)

(52) U.S. Cl. .................. 370/395.2; 370/395.5

(58) Field of Classification Search ............ 370/395.2, 370/395.5, 230, 231, 395.4, 395.41, 252, 370/401, 409–410, 462, 464–469, 395.534, 370/351–356, 389–393, 237, 395.32, 395.54, 370/395.53; 709/227–229, 220–222
See application file for complete search history.

(56) References Cited

U.S. PATENT DOCUMENTS

| 2002/0110087 | A1 | 8/2002 | Zelig et al. |
| 2002/0196808 | A1* | 12/2002 | Karri et al. .................. 370/468 |
| 2003/0156541 | A1 | 8/2003 | Haihong |
| 2004/0136371 | A1 | 7/2004 | Muralidhar et al. |
| 2005/0089047 | A1* | 4/2005 | Ould-Brahim et al. .. 370/395.53 |
| 2005/0213513 | A1* | 9/2005 | Ngo et al. .................. 370/254 |
| 2007/0263634 | A1* | 11/2007 | Reeves et al. ............ 370/395.2 |

FOREIGN PATENT DOCUMENTS

| WO | WO 02/01796    | 1/2002 |
| WO | WO 02/01796 A2 * | 1/2002 |

OTHER PUBLICATIONS

A. Farrel, Ed., RFC 3479, "Fault Tolerance for Label Distribution Protocol (LDP", IETF, Feb. 2003.*
Anderson et al., "LDP Specification", RFC 3036, Internet Engineering Task Force, Jan. 2001.
Rosen et al., "Multiprotocol Label Switching Architecture", RFC 3031, Internet Engineering Task Force, Jan. 2001.

* cited by examiner

*Primary Examiner*—Aung S Moe
*Assistant Examiner*—Habte Mered
(74) *Attorney, Agent, or Firm*—Cindy Kaplan

(57) ABSTRACT

LDP label switching may be discontinued gracefully on one or more selected ones of multiple links interconnecting a pair of label switched routers (LSRs) while leaving label switching in operation on the remaining LDP-enabled links. Mechanisms for graceful shutdown of LDP on a selected link are added by way of modification to one or more of: e.g., LDP discovery Hello messages, LDP Label Withdraw/Label Release messages, LDP Notification messages.

21 Claims, 3 Drawing Sheets

GRACEFUL SHUTDOWN OF LDP ON SPECIFIC INTERFACES BETWEEN LABEL SWITCHED ROUTERS

BACKGROUND OF THE INVENTION

The present invention relates to data networking and more particularly, in certain implementations, to systems and methods for gracefully disabling LDP label switching on selected link(s) between two routers that are connected by multiple parallel links.

MPLS (Multi-Protocol Label Switching) represent an evolution in the routing architecture of IP networks. Benefits include, e.g., better price/performance in routers, scalability, better integration with circuit switched technologies such as Frame Relay and ATM, the ability to implement layer 2 and layer 3 virtual private networks, and improved control of traffic characteristics.

In one simple MPLS scenario, at the ingress of the network, labels are assigned to each incoming IP packet based on its forwarding equivalence class before forwarding the packet to the next hop node. At each intermediate node, a forwarding selection and a new substitute label are determined by using the label found in the incoming packet as a reference to a label forwarding table. At the network egress (or one hop prior), a forwarding decision is made based on the incoming label but no label is included when the IP packet is sent on to the next hop. In other scenarios, the incoming packet that is carried in this way is itself another MPLS packet such that MPLS traffic is carried over another MPLS cloud.

The paths taken by packets that traverse the network in this manner are pre-configured and referred to as label switched paths (LSPs). To assure that traffic is forwarded correctly, each LSR creates "bindings" between IP forwarding equivalence classes and the labels to be used as the index to the forwarding table at that LSR. The previous LSR in line on the LSP must then be informed of these label bindings so that it will correctly encapsulate packets it forwards to the next hop.

Several mechanisms have been developed for the distribution of labels. One is the Label Distribution Protocol (LDP) as described in Andersson, et al., "LDP Specification," RFC 3036, Internet Engineering Task Force, January 2001. LDP provides mechanisms for LSR peers to discover one another and establish communications. LDP also includes mechanisms to tear down sessions, to advertise label bindings, to withdraw previously advertised bindings, and to provide various other types of notification. LDP messages are generally specified as sets of TLV (type, length, value) encoded objects.

LDP can be used to establish and operate LSPs that traverse a pair of routers only when there is an LDP session between the routers. When label switching is to be discontinued, it is desirable that the discontinuation be graceful. Once an LSR discontinues label switching with a peer, MPLS traffic from that peer will be dropped. Thus it is important that both LSRs participating in a session coordinate the discontinuation of label switching so that no traffic is lost. The current LDP specification includes certain provisions which can be used to implement graceful mechanisms to discontinue LDP-based label switching between two LSRs without loss of MPLS traffic.

A complication arises, however, where multiple parallel links are available between two LSRs. LDP will typically operate all of the parallel links under a single LDP session. In certain situations multiple LDP sessions will operate between the two LSRs by using different label spaces. MPLS traffic of a given session can be divided over the multiple links for load-balancing purposes. In certain situations, it will be desirable to discontinue LDP label switching on one or more of the multiple links while continuing label switching on the remaining LDP-enabled links. LDP-related MPLS traffic will then continue flowing on the remaining LDP-enabled links supporting the active session and able to perform label switching. LDP makes no provision for a graceful shutdown of label switching on only selected ones of multiple links. Such a capability is desired.

One technique for providing this capability involves adjustment of underlying routing metrics. If LDP path selection is based on paths learned via an IGP (Interior Gateway Protocol), one can increase the "cost" of links over which a traffic halt is desired. This technique carries several drawbacks. Both MPLS and IP traffic are shifted off these links, causing unnecessary rerouting of traffic. When the IGP costs are modified they must be advertised throughout the network, requiring a large volume of unnecessary routing messages. Also, LDP may learn its paths from static routing rather than IGP, rendering the technique completely useless.

SUMMARY OF THE INVENTION

Embodiments of the present invention allow LDP label switching to be discontinued gracefully on one or more selected ones of multiple links interconnecting a pair of label switched routers (LSRs) while leaving label switching in operation on the remaining LDP-enabled links. Mechanisms for graceful shutdown of LDP on a selected link are added by way of modification to one or more of: e.g., LDP discovery Hello messages, LDP Label Withdraw/Label Release messages, LDP Notification messages.

A first aspect of the present invention provides a method for operating a first label switched router to discontinue LDP label switching on a selected one of a plurality of links between the first label switched router and a second label switched router. The method includes sending a discontinuation notification to the second label switched router, the discontinuation notification being specific to the selected link; after an indication that second label switched router has discontinued LDP switching on the selected link, removing forwarding state for MPLS traffic received via the selected link.

A second aspect of the present invention provides a method for operating a first label switched router to coordinate disconnection with a second label switched router of an LDP session on a selected link of a plurality of links. The method includes: receiving a disconnection notification from the second label switched router, the disconnection notification being specific to the selected link; and, in response to the disconnection notification, halting forwarding of MPLS traffic on the selected link.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative network environment that applies a certain combination of network protocols to forward data through the network and to control this forwarding process. The links may be implemented using any type of physical medium such as, e.g., an optical medium, wireless medium, twisted pair, etc. Links may also be logical connections to give the connected nodes the property of adjacency in view of the operative networking protocols. In one embodiment, the nodes of such a network interoperate in the manner specified by various protocols including, e.g., TCP/IP and protocols defined by, but not limited to, the following documents:

E. Rosen, et al., "Multiprotocol Label Switching Architecture," RFC 3031, Internet Engineering Task Force, January 2001.

L. Andersson, et al., "LDP Specification," RFC 3036, Internet Engineering Task Force, January 2001.

The above documents are incorporated herein by reference in their entirety for all purposes.

Figure 1:
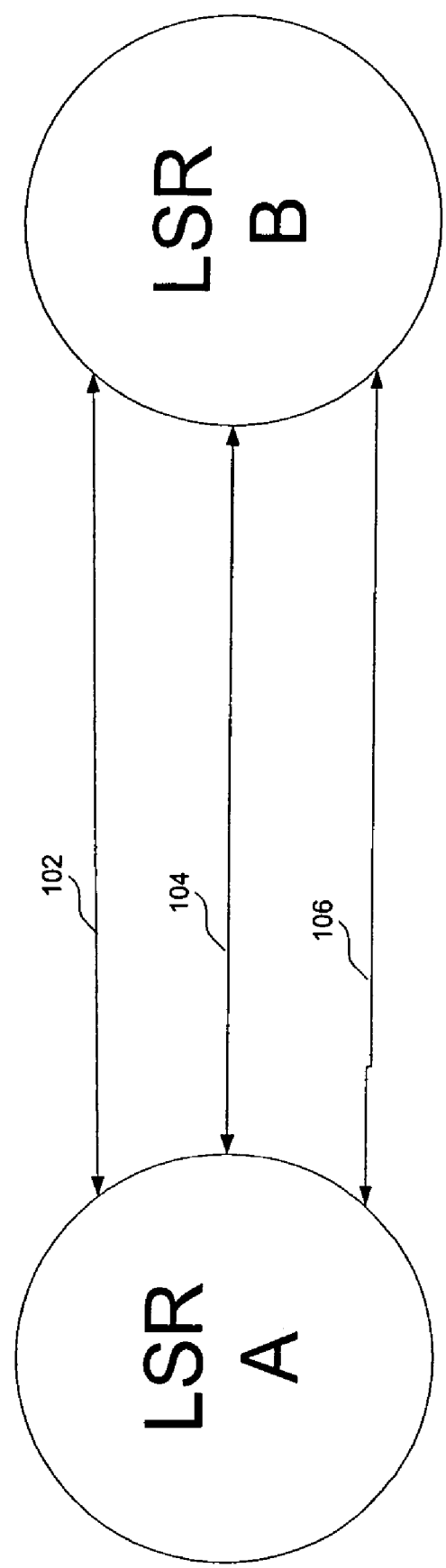
FIG. 1 depicts a pair of label switched routers (LSRs) to which embodiments of the present invention may be applied.

FIG. 1 depicts a pair of label switched routers (LSRs) to which embodiments of the present invention may be applied. LSRs A and B are depicted as being interconnected by three bidirectional links 102, 104, and 106. Label switching based on LDP operates between LSRs A and B and initially employs all three links. All three links may form a part of LSPs that traverse A and B and are established and maintained using LDP.

Figure 2:
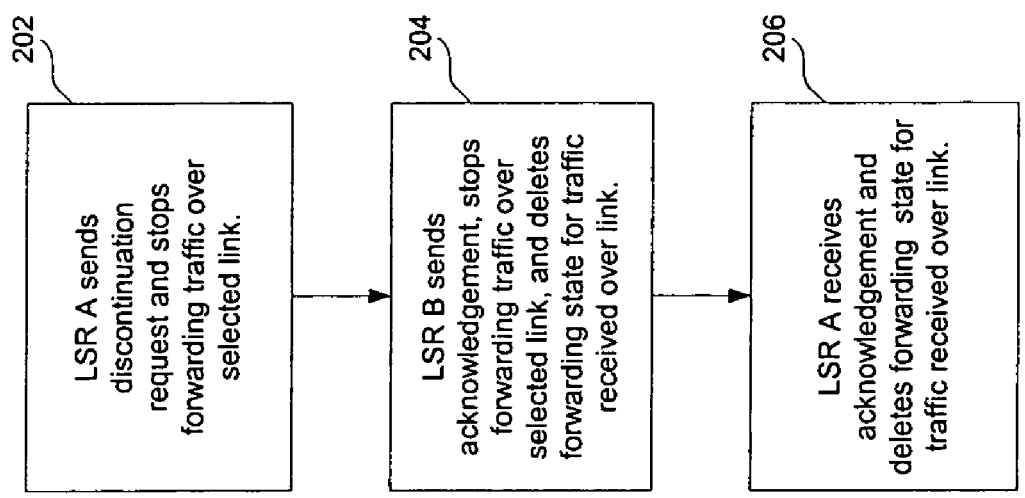
FIG. 2 is a flowchart describing steps of gracefully disabling LDP label switching on one of multiple links according to one embodiment of the present invention.

LSR A now desires to discontinue LDP label switching on link 102 but leave it operational on links 104 and 106. FIG. 2 is a flowchart describing steps of gracefully disabling an LDP session on one of multiple links according to one embodiment of the present invention. At step 202, LSR A sends a label switching discontinuation request to LSR B. LSR A also stops forwarding traffic on link 102 by modifying the forwarding entries that point to the interface coupled to this link. For now, LSR A retains forwarding entries for MPLS traffic received over link 102 so that this incoming labeled traffic is not dropped.

LDP can be modified in a variety of ways to implement the desired graceful shutdown request. In a first embodiment, an LDP Link Hello message, as is used in peer discovery, is adapted to serve as a discontinuation request. Unlike other types of LDP session message which employ TCP, the Link Hello message employs UDP and is transmitted over a specified interface. Here, the specially adapted Link Hello message is sent via link 102 since this is the link on which label switching will be gracefully discontinued. In one particular implementation, a GS (Graceful Shutdown) bit is added to the Common Hello Parameter TLV (type-length-value) object. When this bit is set, it indicates a request to discontinue label switching on the link over which the Hello is being transmitted. In an alternative implementation, a GS TLV is added to the Hello message to signify a label switching discontinuation request.

A second embodiment employs a modified LDP Label Withdraw message as the discontinuation request. LDP employs the Label Withdraw message to revoke a previously advertised binding between a label and forwarding equivalence class. According to this second embodiment of the present invention, an Interface TLV is added to the LDP Label Withdraw message. The Interface TLV identifies the particular interface on LSR A coupled to link 102. The Label Withdraw message modified in this fashion indicates a request to discontinue LDP label switching on this link. The Interface TLV may identify multiple interfaces over which the LDP label switching is to be discontinued. The fields of the Label Withdraw message that typically specify a label and FEC for which the binding is to be withdrawn do not have any significance in this usage.

A third embodiment employs a modified LDP Notification message as the label switching discontinuation request. LDP employs the Notification message to inform an LDP peer of errors and other advisory information. According to this third embodiment of the present invention, the LDP Notification message is adapted to serve as a discontinuation request by inclusion of a GS_REQ TLV object. This GS_REQ TLV includes identifiers for the interfaces on which LDP label switching is to be discontinued. There is also optionally an additional TLV that specifies the interfaces on which LDP label switching is to be maintained.

At step 204, the LSR B, after having received the discontinuation request, sends an acknowledgement. LSR B also responds to the discontinuation request by ceasing to forward LDP-related MPLS traffic over link 102. LSR B deletes or modifies forwarding table entries corresponding to both directions of traffic over link 102. After this, LSR B will drop any received traffic for these LSPs over link 102 although no such traffic is anticipated since LSR A should have already deleted the forwarding state that would lead to such use of link 102. Also, LSR B ceases forwarding LDP-related MPLS traffic onto link 102.

The message format used for the acknowledgement will depend on how the discontinuation request was transmitted. If a Hello message was used as the discontinuation request, the acknowledgement will also be a Hello message with either the GS bit set or the GS TLV included. The acknowledgement Hello message will also be sent over the link to be discontinued for LDP label switching.

If an LDP Label Withdraw message was used for the discontinuation request, an LDP Release message is used for the acknowledgement. LDP uses the Label Release message to notify a peer LSR that a received Label Withdraw message has been processed and that the cited label is no longer in use. The Label Withdraw and Label Release messages do not serve this purpose when used to implement embodiments of the present invention. The Label Release message is adapted to include the same Interface TLV included in the modified Label Withdraw message.

If an LDP Notification message was used for the discontinuation request, another LDP Notification message is used for the acknowledgement. The acknowledgement LDP Notification message is adapted to include a GS_ACK TLV that identifies the specific interface(s) on which LDP label switching is to be discontinued. There may also be an Interface TLV to verify the interfaces on which LDP operation is to continue.

At step 206, LSR A receives the acknowledgement and responds by deleting forwarding state for LDP-related traffic received over link 102. Further such traffic received over link 102 will now be dropped. If no acknowledgement is received for a predetermined time interval or a series of non-acknowledging Hello messages are received over link 102, then LSR A will delete forwarding state anyway since there appears to be a fault at LSR B.

Interface identifiers as described above are required for the Label Withdraw, Label Release, and Label Notification messages since these messages are sent via TCP and the interface employed for their transmission is not specified. The interface identifiers used in these messages may be either numbered or unnumbered. A numbered interface identifier is an IPv4 or IPv6 address that specifies the interface. An unnumbered interface identifier is a locally significant address assigned by a node attached to the interface. The unnumbered interface identifier includes local ID of the interface.

It will be seen that LDP may be discontinued gracefully on one or more links between a pair of LSRs without completely shutting down LDP between the LSRs. Another advantage is that there is minimal or no traffic loss.

Figure 3:
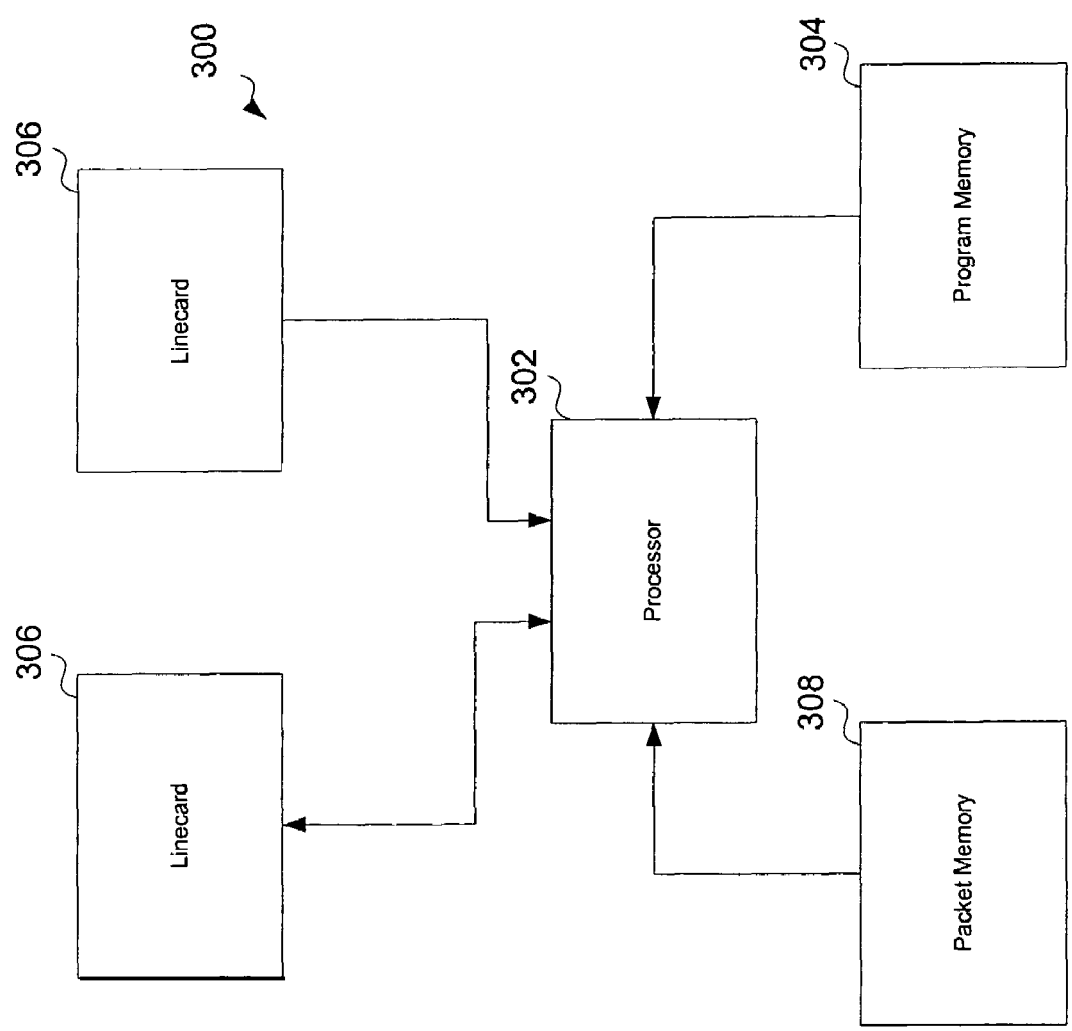
FIG. 3 depicts a network device to which embodiments of the present invention may be applied.

FIG. 3 depicts a network device 300 that may be used to implement, e.g., either of the routers of FIG. 1 and/or perform any of the steps of FIG. 2. In one embodiment, network device 300 is a programmable machine that may be implemented in hardware, software, or any combination thereof. A processor 302 executes codes stored in a program memory 304. Program memory 304 is one example of a computer-readable medium. Program memory 304 can be a volatile memory. Another form a computer-readable medium storing the same codes would be some types of non-volatile storage such as floppy disks, CD-ROMs, DVD-ROMs, hard disks, flash memory, etc.

Network device 300 interfaces with physical media via a plurality of linecards 306. Linecards 306 may incorporate Ethernet interfaces, DSL interfaces, Gigabit Ethernet interfaces, 10-Gigabit Ethernet interfaces, SONET interfaces, etc. As packets are received, processed, and forwarded by network device 300, they may be stored in a packet memory 308. Network device 300 implements all of the network protocols and extensions thereof described above as well as the data networking features provided by the present invention.

In one implementation, control plane operations such as the exchange of LDP messages are controlled by processor 302 while forwarding tables are maintained on linecards 306. The present invention is, however, not limited to a distributed architecture. To implement functionality according to the present invention, linecards 306 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the term "LDP" as used herein also refers to further revisions and evolutions of this protocol. Also, embodiments of the present invention may be applied to deployments where multiple LDP sessions exist between two LSRs, each having its own label space. In these situations, the present invention may applied to discontinuation of a given session on one or more of multiple links on which it has been operating.

The invention claimed is:

1. A method for operating a first label switched router to gracefully discontinue LDP label switching on a selected one of a plurality of links between said first label switched router and a second label switched router, said method comprising:
    sending a discontinuation notification to said second label switched router, said discontinuation notification being specific to said selected link; and
    after an indication that said second label switched router has discontinued LDP switching on said selected link, modifying a forwarding entry associated with said selected link so that MPLS traffic received via said selected link is no longer forwarded while label switching on one or more of said plurality of links continues;
    wherein sending said discontinuation notification comprises:
    sending an LDP Link Hello message via said selected link, said LDP Link Hello message including a discontinuation indictor comprising a graceful shutdown bit.

2. The method of claim 1 wherein said indication comprises receipt of a response to said discontinuation notification.

3. The method of claim 1 wherein said indication comprises passage of time since sending said discontinuation notification.

4. A method for operating a first label switched router to gracefully discontinue LDP label switching on selected one of a plurality of link between said first label switched router and a second label switched router, said method comprising:
    sending a discontinuation notification to said second label switched router, said discontinuation notification being specific to said selected link; and
    after an indication that said second label switched router has discontinued LDP switching on said selected link, modifying a forwarding entry associated with said selected link so that MPLS traffic received via said selected link is no longer forwarded while label switching on one or more of said plurality of links continues;
    wherein sending said discontinuation notification comprises:
    sending an LDP Link Hello message via said selected link, said LDP Link Hello message including a discontinuation indicator comprising a graceful shutdown type length value (TLV) object.

5. The method of claim 4 wherein said indication comprises receipt of a response to said discontinuation notification.

6. The method of claim 4 wherein said indication comprises passage of time since sending said discontinuation notification.

7. A method for operating a first label switched router to gracefully discontinue LDP label switching on a selected one of a plurality of links between said first label switched router and a second label switched router, said method comprising:
    sending a discontinuation notification to said second label switched router, said discontinuation notification being specific to said selected link; and
    after an indication that said second label switched router has discontinued LDP switching in said selected link, modifying a forwarding entry associated with said selected link so that MPLS traffic received via said selected link is no longer forwarded while label switching on one or more of said plurality of links continues;
    wherein sending said discontinuation notification comprises:
    sending an LDP label withdraw message, said LDP label withdraw message comprising an indicator that specifies said selected link among said plurality of links, said indicator comprising a type length value (TLV) object.

8. The method of claim 7 wherein said indication comprises receipt of a response to said discontinuation notification.

9. The method of claim of 7 wherein said indication comprises passage of time sending said discontinuation notification.

10. A method for operating a first label switched router to gracefully discontinue LDP label switching on a selected one of a plurality of links between said label switched router and a second label switched router, said method comprising:
    sending a discontinuation notification to said second label switched router, said discontinuation notification being specific to said selected link; and after an indication that said second label switched router has discontinued LDP switching on said selected link, modifying a forwarding entry associated with said selected link so that MPLS traffic received via said selected link is no longer forwarded while label switching on one or more of said plurality of links continues;

wherein sending said discontinuation notification comprises:

sending an LDP Notification message, said LDP Notification message comprising a discontinuation indicator that specifies said selected link among said plurality of links, said discontinuation indication comprising a type length value (TLV) object.

11. The method of claim 10 wherein said indication comprises receipt of a response to said discontinuation notification.

12. The method of claim 10 wherein said indication comprises passage of time since sending said discontinuation notification.

13. Apparatus for operating a first label switched router to gracefully discontinue LDP label switching on a selected one of a plurality of links between said first label switched router and a second label switched router, said apparatus comprising:

a processor;

a memory device that stores instructions for execution by said processor, said instruction comprising;

code that causes transmission of a discontinuation notification to said second label switched router, said discontinuation notification being specific to said selected link; and code that causes, after an indication that second label switched router has discontinued LDP label switching on said selected link, modification of a forwarding entry associated with said selected link so that MPLS traffic received via said selected link is no longer forwarded while label switching on one or more of said plurality of links continues;

wherein said code that causes transmission of said discontinuation notification comprises code that causes transmission of an LDP Link Hello message via said selected link, said LDP Link Hello message including a discontinuation indicator comprising a graceful shutdown type length value (TLV) object.

14. The apparatus of claim 13 wherein said indication comprises receipt of a response to said discontinuation notification.

15. The apparatus of claim 13 wherein said indication comprises passage of time since sending said discontinuation notification.

16. Apparatus for operating a first label switched router to gracefully discontinue LDP switching on a selected one of a plurality of links between said first label switched router and a second label switched router, said apparatus comprising:

means for sending a discontinuation notification to said second label switched router, said discontinuation notification being specific to said selected link; and means for, after an indication that said second label switched router has discontinued LDP label switching on said selected link, modifying a forwarding entry associated with said selected link so that MPLS traffic received via said selected link is no longer forwarded while label switching on one or more of said plurality of links continues;

wherein means for sending a discontinuation notification comprises means for transmitting an LDP Label Withdraw message, said LDP Label Withdraw message comprising an indicator that specifies said selected link among said plurality of links and comprises a type length value (TLV) object.

17. The apparatus of claim 16 wherein said indication comprises receipt of a response to said discontinuation notification.

18. The apparatus of claim 16 wherein said indication comprises passage of time since sending said discontinuation notification.

19. Apparatus for operating a first label switched router to gracefully discontinue LDP label switching on a selected one of a plurality of links between said first label switched router and a second label switched router, said apparatus comprising:

a processor;

a memory device that stores instructions for execution by said processor, said instructions comprising:

code that causes transmission of a discontinuation notification to said second label switched router, said discontinuation notification being specific to said selected link; and code that causes, after an indication that second label switched router has discontinuation LDP label switching on said selected link, modification of a forwarding entry associated with said selected link so that MPLS traffic received via said selected link is no longer forwarded while label switching on one or more of said plurality of links continues;

wherein code that causes transmission of a discontinuation notification comprises:

code that causes transmission of an LDP Notification message, said LDP Notification message comprising a discontinuation indicator that specific said selected link among said plurality of links and comprises a type length value (TLV) object.

20. The apparatus of claim 19 wherein said indication comprises receipt of a response to said discontinuation notification.

21. The apparatus of claim 19 wherein said indication comprises passage of time since sending said discontinuation notification.

* * * * *

UNITED STATES PATENT AND TRADEMARK OFFICE
CERTIFICATE OF CORRECTION

PATENT NO. : 7,646,772 B2 Page 1 of 1
APPLICATION NO. : 10/918089
DATED : January 12, 2010
INVENTOR(S) : Sivabalan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1514 days.

Signed and Sealed this

Fourth Day of January, 2011

David J. Kappos
*Director of the United States Patent and Trademark Office*